United States Patent [19]

Freer

[11] Patent Number: 4,902,231

[45] Date of Patent: Feb. 20, 1990

[54] LEARN TO TYPE VIA MNEMONIC DEVICES, AND METHODS OF CONSTRUCTING AND UTILIZING SAME

[76] Inventor: Clare W. Freer, 9554 Brady, Redford Township, Wayne County, Mich. 48239

[21] Appl. No.: 267,805

[22] Filed: Nov. 7, 1988

[51] Int. Cl.⁴ .......................................... G09B 13/00
[52] U.S. Cl. ....................................................... 434/227
[58] Field of Search ............................... 434/227, 233

[56] References Cited

U.S. PATENT DOCUMENTS

| | | | |
|---|---|---|---|
| 1,527,100 | 2/1925 | Williams | 434/227 |
| 1,734,115 | 11/1929 | Cooper, Sr. | 434/232 |
| 2,053,874 | 9/1936 | O'Donnell | 434/227 |
| 3,501,849 | 3/1970 | Olsen | 434/233 |
| 4,580,984 | 4/1986 | Madaus | 434/227 |

Primary Examiner—William H. Grieb
Attorney, Agent, or Firm—Irving M. Weiner; Robert M. Petrik; Joseph P. Carrier

[57] ABSTRACT

An educational device for teaching touch typing. The device includes a chart to be place in the view of the student and a series of overlays to be used on the individual student keyboards. The chart and overlays give the student the visual and mental impressions necessary to remember the location of individual keys without having to look at the keys.

18 Claims, 3 Drawing Sheets

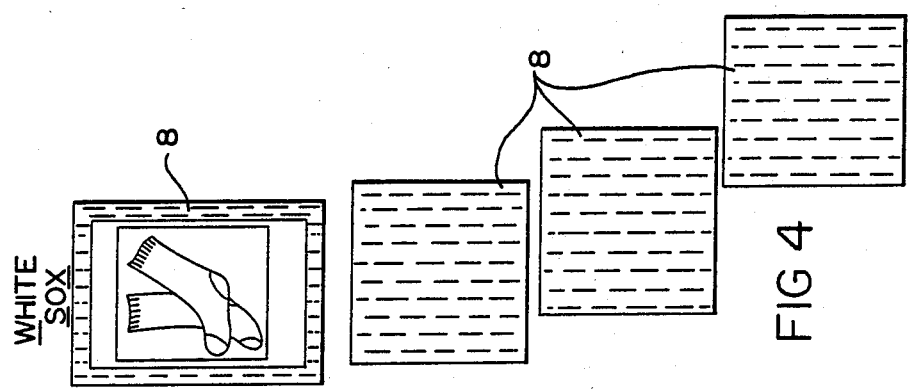
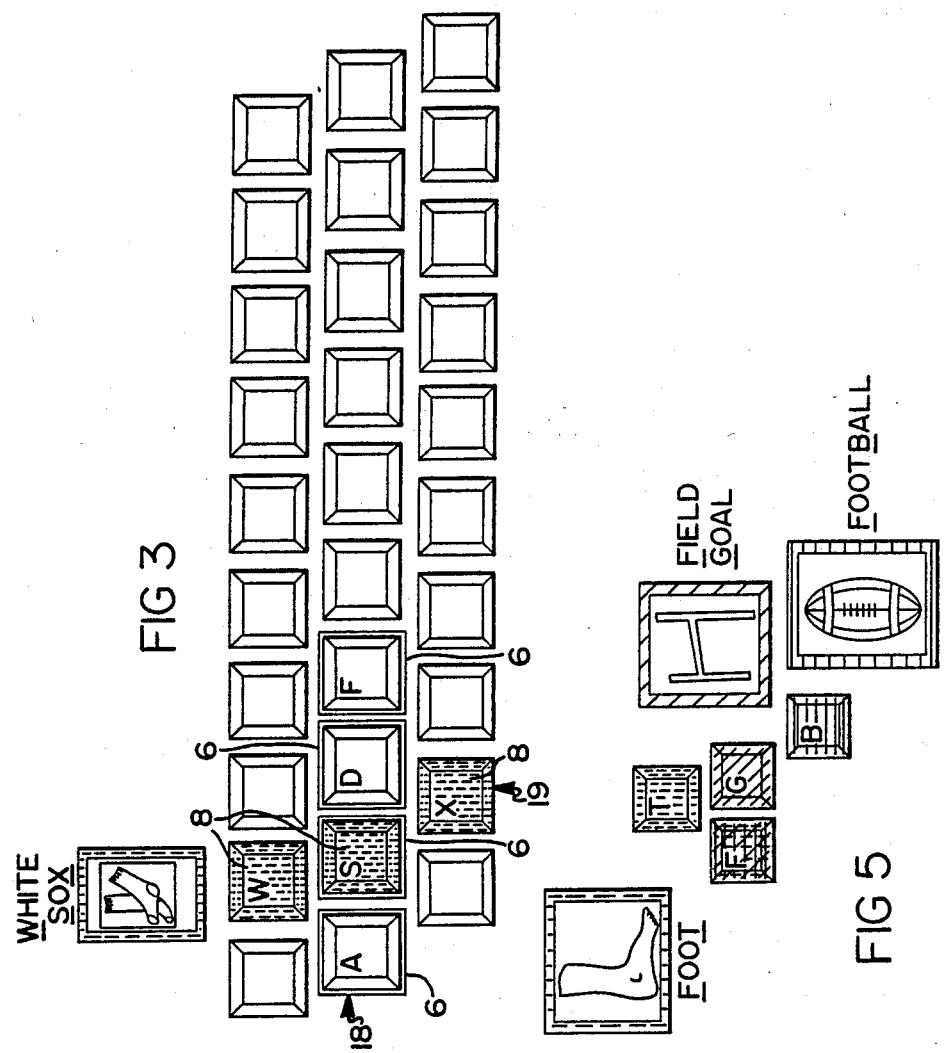

LEARN TO TYPE VIA MNEMONIC DEVICES, AND METHODS OF CONSTRUCTING AND UTILIZING SAME

BACKGROUND OF THE INVENTION

1. Field of the Invention

The present invention relates to a method of learning to type faster and more accurately. More particularly, the invention relates to mnemonic devices to aid in teaching and learning to type.

Prior to the present invention, typing was taught by annoying practice exercises. The present invention eliminates the drudgery associated with these exercises.

2. Description of the Relevant Art

Heretofore, there have been various means of teaching and/or learning to type. The relevant art is exemplified by the following United States Patents.

U.S. Pat. No. 4,580,984 issued in 1986 to Madaus entitled "SIMULATED KEYBOARD SYSTEM", discloses a simulated keyboard for practicing typing which does not require the use of an actual computer or typewriter keyboard. The simulated keyboard resembles a standard keyboard in size and provides a second keyboard for visually dividing the keys into the standard finger grouping columns.

U.S. Pat. No. 2,053,874 issued in 1936 to O'Donnell entitled "EDUCATIONAL DEVICE", discloses a device used in the teaching of the "touch system" of typing. This device is also a simulated keyboard which separates the keys commonly used by each hand.

U.S. Pat. No. 1,734,115 issued in 1929 to Cooper entitled "EDUCATIONAL DEVICE", discloses a device to be positioned upon a standard typewriter and actuated through the normal operation of the typewriter keys. The device includes shutters which are lowered to momentarily reveal the character corresponding to the particular key that is depressed.

U.S. Pat. No. 1,527,100 issued to Williams entitled "DEVICE FOR TEACHING TOUCH TYPEWRITING" discloses a simulated practice keyboard to effect muscular memory for accurate response on the keys of the typewriter.

The present invention differs from the prior art by providing a mnemomic device for rapidly teaching people unfamiliar with a keyboard to type at fast speeds in the shortest time possible.

SUMMARY OF THE INVENTION

The present invention provides a large chart which is adapted to be positioned within the view of the typing students, preferably on the wall of a classroom. The chart has inscribed thereon the keyboard of a standard typewriter or computer. Also depicted thereon, are mnemonic devices for aiding the students in remembering the location of the particular keys of the keyboard.

The present invention also contemplates a series of overlays for each students individual which depicts the same mnemonic devices as shown on the large chart. In a preferred embodiment, the chart and overlays will associate certain keys of the keyboard with a particular finger so that a student typist can easily recall where each letter is located. The chart and overlays will also define the "home keys" for the student typist.

It is an object of the present invention to provide a teaching method for typist unfamiliar with a standard keyboard.

It is also an object of the present invention to provide a chart and overlays to enhance the teaching method set forth above.

It is also an object of the present invention to draw attention only to those particular keys a student should be concentrating on.

The above and further objects, details and advantages of the invention will become apparent from the following detailed description, when read in conjunction with the accompanying drawings.

DETAILED DESCRIPTION OF THE PREFERRED EMBODIMENT

Figure 1:
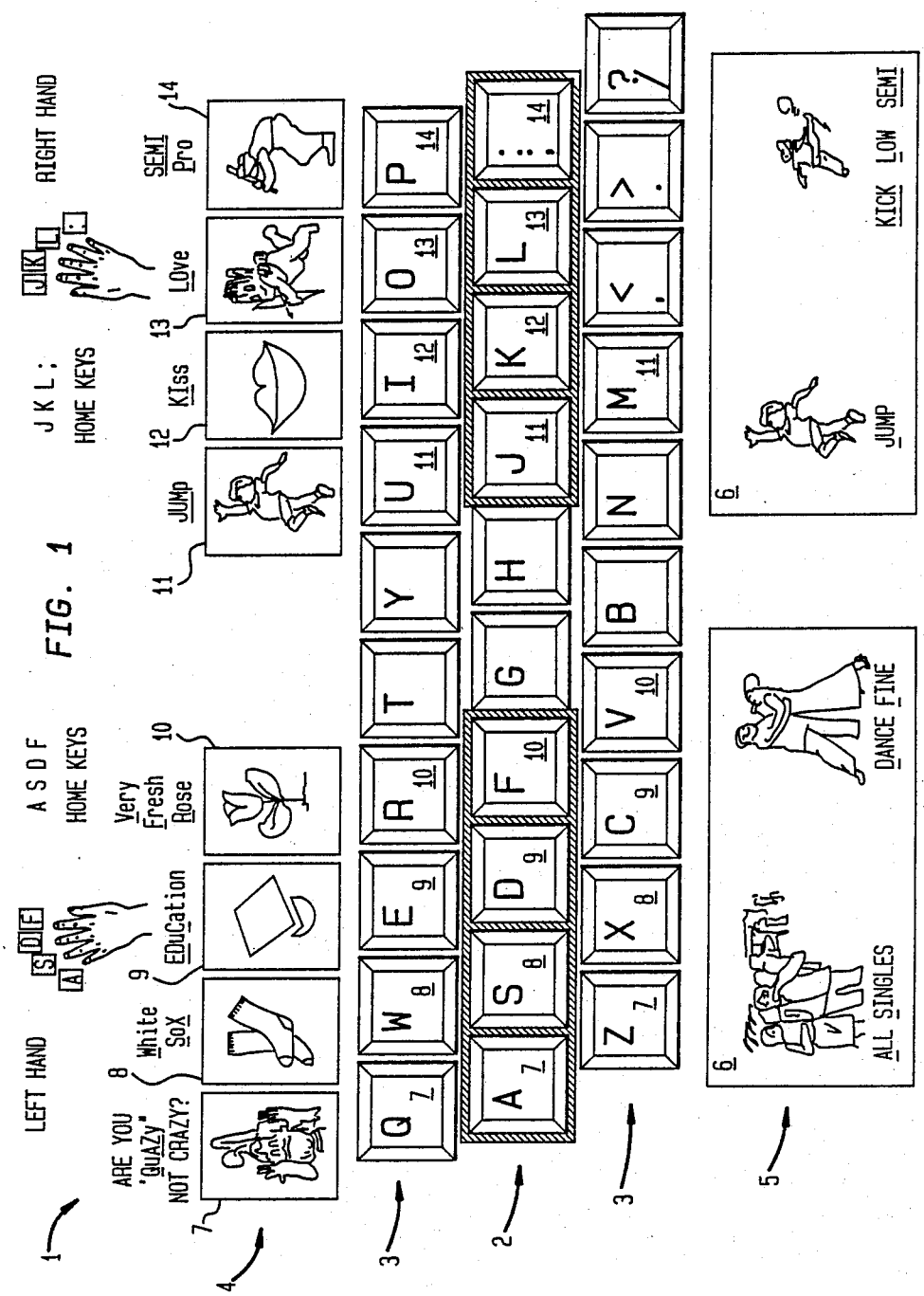
FIG. 1 is a plan view showing a portion of the chart.

FIG. 1 shows the upper half portion of the chart 1 which is adapted to be positioned within the view of a student or students. The chart includes a representation of a typical keyboard arrangement 1. The keyboard is arranged in, as is known in the art, the QWERTY keyboard.

The present invention provides a means for remembering the location of the keys of the keyboard without having to look for and at the keys. The touch method of typing comprises placing ones fingers on a "home row" 2 and searching for the letters not on row 2. The row 2 includes keys A, S, D, F, J, K, L and semi-colon. The "A" key receives the pinky finger of the left hand with each consecutive key receiving the next consecutive finger. The semi-colon key receives the pinky of the right hand with each consecutive key receiving the next consecutive finger. The thumb on each hand is not placed on a key.

The mnemonic means of the present invention includes visual aids and phrases to help the student typist to remember the location of the keys. The visual aids include pictures and colors. The pictures show the phrases associated with the keys. The keys and pictures are differentiated by different colored keys, borders, and pictures.

There is shown on the chart, a mnemonic means 5 for aiding the student in remembering what keys correspond to the home key letters. These comprise, preferably but not necessarily, for the left hand, All Singles Dance Fine, and, for the right hand, Jump, Kick, Low Semi. The chart shows the mnemonic means 5 as pictures with the corresponding phrases set forth below the pictures.

Further mnemonic means shown on the chart include visually showing the letters in the home row bordered by the same color 6.

For example, the keys A, S, D, F, J, K, L, and semi-colon on the chart may be bordered by the color yellow with pictures depicting "All Singles", "Dance Fine", "a Jump", "a Kick Low".

After the student has become familiar with the home keys, secondary rows 3 above and below the home key row 2 may be discussed.

The left hand pinky finger is on the "A" key. This finger can reach the Q key in row 3 above the A key and the Z key below the A key. Thus, the A, Q, and Z keys are associated in a column by using the same finger for these keys. These keys 7 should be provided in the same color with mnemonic means 4 being similar to those used for home keys 2. The other associated keys 8, 9, 10, 11, 12, 13 and 14, are different colors to aid in the visual memory effect.

For example, the letters 7 (Q, A, Z) may be colored light blue with a mnemonic means 4 depicting a crazy looking person. The words "are you Quazy" would be printed near the picture. Again, the picture could be the same color as the keys.

A table of some mnemonic phrases are set forth below. This table shows preferred phrases to remember the location of a particular key. Many other phrases could be used to remember the same associated letters.

TABLE I

| LEFT HAND | (Home Keys) RIGHT HAND | FINGER |
|---|---|---|
| All | Semi | Pinky |
| Singles | Low | Ring |
| Dance | Kick | Middle |
| Fine | Jump | Index |

TABLE II

| LEFT HAND | (Secondary Keys) RIGHT HAND | FINGER |
|---|---|---|
| Are you QuAZy? | JUMp | Pinky |
| White SoX | KIss | Ring |
| EDuCation | LOve | Middle |
| Very Fresh Rose | SEMI Pro | Index |

In tables I and II, the underlined letters indicate the key on the keyboard that is to be memorized using this method. Each mnemonic means includes pictures 4, 5 depicting the phrase shown on the table as discussed in the examples set forth above.

Even after the home row 2 and the secondary rows 3 are located and put to memory by the student, a set of keys in the center of the keyboard have not been "assigned" a finger.

Figure 2:
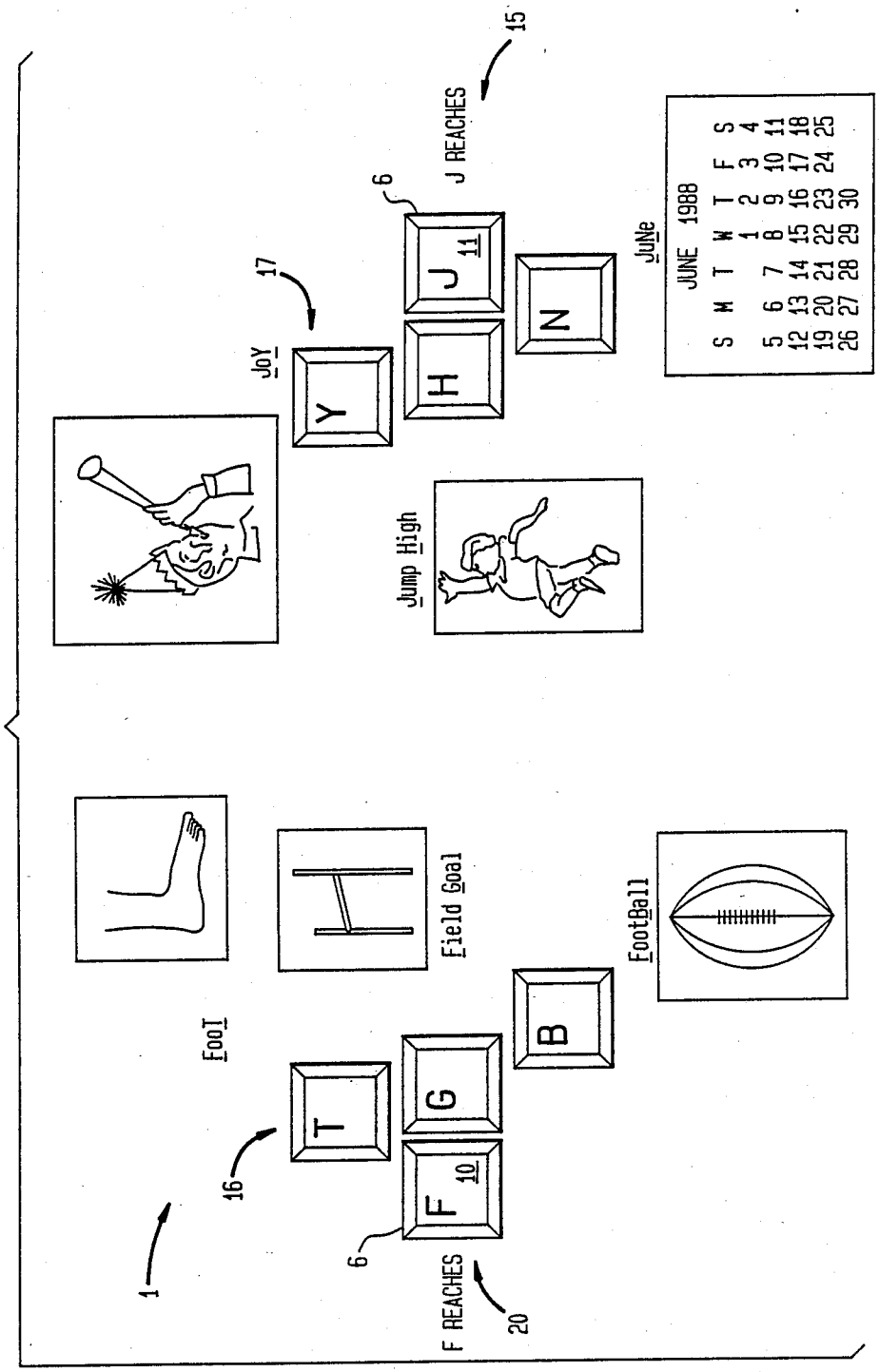
FIG. 2 is a plan view showing a second portion of the chart.

These tertiary keys 16, 17 as shown in FIG. 2, are reached by the index finger of each hand. The home keys of these fingers are F, and J. The chart 1 shows phrases similar to those discussed previously.

TABLE III

| LEFT INDEX | (Tertiary Keys) RIGHT INDEX |
|---|---|
| FooT | JoY |
| FieldGoal | Jump High |
| FootBall | JuNe |

Table III shows preferred phrases similar to those shown in Tables I and II. Again, pictures depicting these phrases are also shown on the chart 1.

It should be noted that Tables I, II and III set forth preferred phrases. Other phrases are possible. For example, "jump high" could also be "jungle heat".

It is also contemplated to provide overlays for the keyboard to highlight only those particular keys on which attention is to be concentrated. Each of the overlays comes from chart 1.

Figure 3:
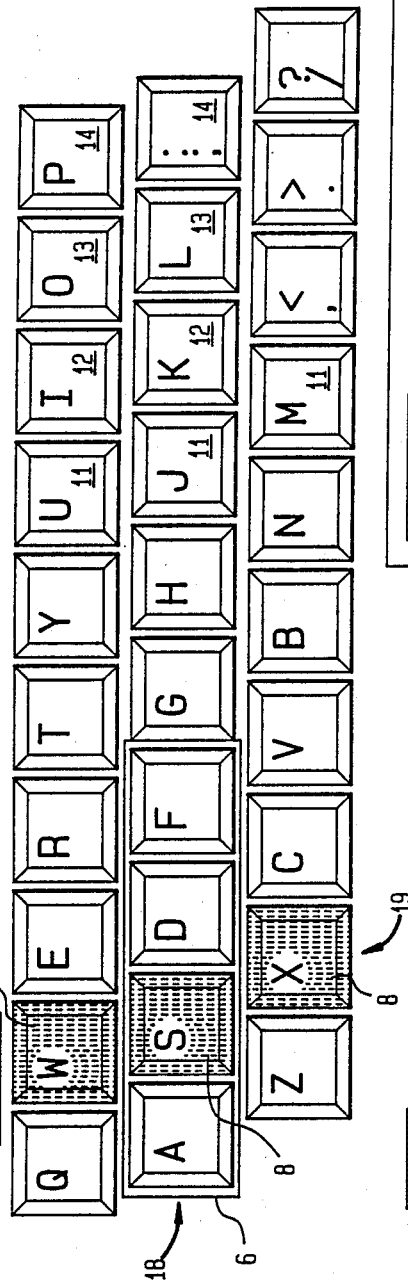
FIG. 3 is a plan view of an example overlay positioned on the keyboard.

FIG. 3 depicts two representative overlays placed on the keyboard. Overlay 18 borders home row 2. Overlay 19 covers the keys W, S, X and shows the mnemonic means for highlighting these letters.

FIG. 3 only shows two of the several overlays that are contemplated. Each pharse and mnemonic means discussed previously may have an overlay to be used on the keyboard.

Figure 4:
FIG. 4 is a view of an example overlay.
Figure 5:
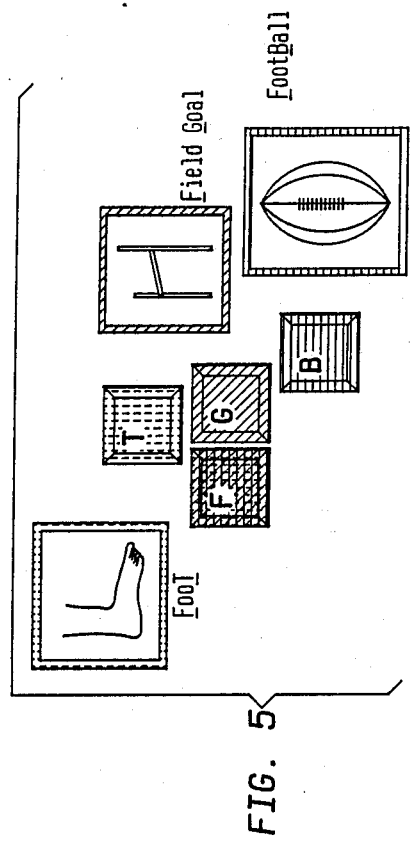
FIG. 5 is a plan view of a second overlay.
Figure 5:
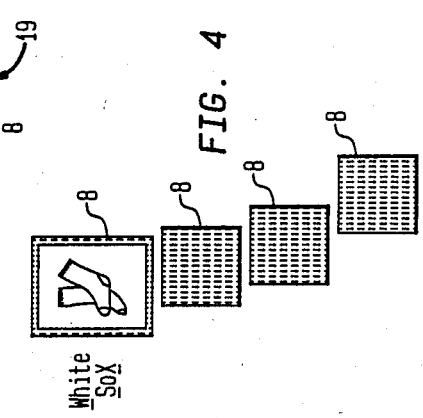

FIGS. 4 and 5 show two representative overlays. These may be placed on the keyboard to highlight keys the student may be having trouble remembering the location of.

There will be an overlay of each set of associated keys 6, 7, 8, 9, 10, 11, 12, 13 and 14. Each overlay would be a different color and include a picture depicting a mnemonic phrase. Thus, every overlay is shown on chart 1 shown in FIGS. 1 and 2.

To further enhance the visual image of the chart 1 and overlays, the pictures may be bordered by the same color as the keys. This will aid in visually associating the keys with the mnemonic means.

Though there have been described what are at present considered to be the preferred embodiments of the invention, it will be understood that various modifications may be made therein without departing from the spirit of the invention. The present embodiments are therefore to be considered as illustrative, and not restrictive. The scope ofthe invention is indicated by the appended claims, rather than by the foregoing description.

I claim:

1. An educational device for teaching touch typewriting, comprising:
   a chart adapted to be positioned within the view of the student typist;
   said chart showing a representation of a standard keyboard;
   said chart including mnemonic means for remembering the location of the individual keys on said keyboard; and
   said mnemonic means includes a color coding of said keys and pictures which are indicative of phrases that aid in remembering the location of certain keys.

2. The device according to claim 1, wherein:
   two of said phrases represent the letters imprinted on the home keys of said keyboard.

3. The device according to claim 2, wherein:
   said home keys correspond to the keys in the middle row of the keyboard.

4. The device according to claim 3, wherein:
   said home keys are the keys represented by the letters A, S, D, F, J, K, L;
   said keys being bordered by the same color.

5. The device of claim 1, wherein:
   said mnemonic means provides a visual and mental impression for the student typist to recall the location of said keys.

6. The device of claim 5, wherein:
   said visual impression is provided by different colors on the chart; and
   said mental impression is provided by said phrases.

7. The device of claim 6, wherein:
   said visual impression includes pictures that represent said phrases.

8. The device of claim 7, wherein:
   said visual impression includes associating the colors with the pictures and the phrases.

9. The device of claim 8, wherein:
   said phrases include:
   All Singles Dance Fine, Jump Kick Low Semi, Are You Quazy?, White Sox, Education, Very Fresh Rose, Jump, Kiss, Love, Semi-Pro, Foot, Fieldgoal, Football, Joy, Jump High, and June.

10. The device of claim 9, wherein:
a series of overlays similar to said chart is provided for use on an individual keyboard.

11. The device of claim 10, wherein:
said overlays draw attention only to the particular keys the student typist should be concentrating on.

12. The device of claim 11, wherein:
said overlays include said visual and mental impressions.

13. The device of claim 12, wherein:
said overlays can be used singly or together to aid the student with certain keys.

14. A method of teaching touch typing, including:
positioning a chart showing a representation of a standard keyboard, adapted to be positioned in the view of the students;
placing overlays adapted to be positioned on individual student keyboards;
said chart and overlays include a mnemonic means for memorizing the location of individual keys; and
said method provides a student typist with mental and visual aids by delineating associated keys of said keyboard by color coding and phrases representing said associated keys.

15. The method of claim 14, wherein:
said keyboard is color coded to divide said keys into a home row, secondary columns, and tertiary columns.

16. An educational device for teaching touch typewriting, comprising:
a chart adapted to be positioned within the view of the student typist;
said chart showing a representation of a standard keyboard; and
said chart showing mnemonic means for locating individual keys on said keyboard by providing color coding of individual keys in at least two directions.

17. The device according to claim 16, wherein:
said mnemonic means includes pictures which are indicative of phrases that aid in remembering the location of certain keys.

18. The device according to claim 16, wherein:
said color coding of said keys includes at least one color coded set of keys in the lengthwise direction of said keyboard known as the home keys.

* * * * *

UNITED STATES PATENT AND TRADEMARK OFFICE
CERTIFICATE OF CORRECTION

PATENT NO. : 4,902,231

DATED : February 20, 1990

INVENTOR(S) : Clare W. Freer

It is certified that error appears in the above-identified patent and that said Letters Patent is hereby corrected as shown below:

```
Column 1, line 67, change "typist" to --typists--.
Column 3, line 51, change "FooT" to --FooT--.
In the Abstract, line 2, change "place" to --placed--.
```

Signed and Sealed this

Twenty-eighth Day of May, 1991

*Attest:*

HARRY F. MANBECK, JR.

*Attesting Officer*     *Commissioner of Patents and Trademarks*